(12) United States Patent  
Chen et al.

(10) Patent No.: US 7,555,705 B2  
(45) Date of Patent: Jun. 30, 2009

(54) ANNOTATION MANAGEMENT IN A PEN-BASED COMPUTING SYSTEM

(75) Inventors: Zheng Chen, Beijing (CN); Barn-Wan Li, San Jose, CA (US); Jian Wang, Beijing (CN); Wei-Yin Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 10/659,568

(22) Filed: Sep. 10, 2003

(65) Prior Publication Data

US 2005/0055628 A1    Mar. 10, 2005

(51) Int. Cl.
*G06F 17/00* (2006.01)

(52) U.S. Cl. .................................................. 715/230

(58) Field of Classification Search .............. 715/512, 715/230

See application file for complete search history.

(56) References Cited

U.S. PATENT DOCUMENTS

| | | | | |
|---|---|---|---|---|
| 6,397,213 B1 * | 5/2002 | Cullen et al. | ................... | 707/5 |
| 6,457,026 B1 * | 9/2002 | Graham et al. | .............. | 715/512 |
| 6,509,912 B1 * | 1/2003 | Moran et al. | ................. | 715/762 |
| 6,778,979 B2 * | 8/2004 | Grefenstette et al. | ........... | 707/3 |
| 6,868,525 B1 * | 3/2005 | Szabo | ......................... | 715/738 |
| 6,941,321 B2 * | 9/2005 | Schuetze et al. | ........ | 707/103 R |
| 7,091,959 B1 * | 8/2006 | Clary | ........................ | 345/173 |
| 7,107,261 B2 * | 9/2006 | Farrett | .......................... | 707/3 |

OTHER PUBLICATIONS

Price et al., "Linking By Inking: Trailblazing in a Paper-like Hypertext", HyperText 98, Pittsburgh, PA, copyright ACM 1998, p. 30-39.*

Haveliwala et al., "Evaluating Strategies for Similarity Search on the Web", WWW2002, May 2002, p. 432-442.*

* cited by examiner

*Primary Examiner*—Amelia Rutledge
(74) *Attorney, Agent, or Firm*—Lee & Hayes, PLLC

(57) ABSTRACT

Systems and methods are described for managing annotations in pen-based computing systems. The systems and methods described herein provide ways to collect, manage, search and share personal information entered by way of handwritten annotations. Annotations are used to drive applications, serve as gestures, find related information and to further manage information. Context information is obtained when a user enters an annotation, and is used to assist in determining and locating relevant content in which the user may be interested, whether in the same document or a different document located on a local computer or on the Internet or other network.

32 Claims, 6 Drawing Sheets

300

400

500

600

ANNOTATION MANAGEMENT IN A PEN-BASED COMPUTING SYSTEM

TECHNICAL FIELD

The systems and methods described herein relate to pen-based computing systems. More particularly, the systems and methods described herein relate to annotation management in a pen-based computing system.

BACKGROUND

The abundance of information available via network technology and advanced storage technology are but some of the reasons that a single person can now amass an enormous amount of information. This information takes many forms, including personal documents, web pages, multimedia content, and the like.

However, as the amount of information a user accumulates has greatly increased, so has the logistical problem of managing all of the information so that it is practical for the user to access and use all of the information. To efficiently manage such information, a user must have the facility to search the information, move data between files, utilize application programs with the information, share information with others, etc.

As traditional keyboard-based platforms give way to more and more pen-based platforms—such as PDAs (personal digital assistants), pocket PCs (personal computers), advanced telephones and pagers, etc.—information management has yet another problem to overcome because traditional ways to manage information do not always work well with the pen-based systems.

On the other hand, pen-based systems provide a new tool for managing information in that the pen functions to allow a user to enter handwritten annotations in an electronic document. Proper management of these handwritten annotations can lead to easier and more efficient information management in pen-based computing systems.

SUMMARY

Systems and methods are described for managing annotations in pen-based computing systems. The systems and methods described herein provide ways to collect, manage, search and share personal information entered by way of handwritten annotations. Handwritten annotations include multiple types of mark-up such as underlines, circles, blocks, arrows and callouts.

In one or more implementations described herein, annotations are used to drive applications, serve as gestures, find related information of interest to a user, and to further manage information. Context information is obtained when a user enters an annotation, and is used to assist in determining and locating relevant content in which the user may be interested, whether in the same document or a different document located on a local computer or on the Internet or other network.

The annotations may be used across several platforms and applications, such as a word processor, a web browser, a personal information management program, and the like. Annotations may also be anchored to a document so that the annotation re-appears each time the document is recalled. Also, after one or more documents are annotated, the annotations may be searched like any other part of the document.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

The following describes systems and methods for managing annotations in a pen-based computing system. The systems and methods that are described can automatically collect, manage, search and share personal information by utilizing a user's interaction, i.e. annotation(s), related to content viewed by the user.

Exemplary Computing Environment

Figure 1:
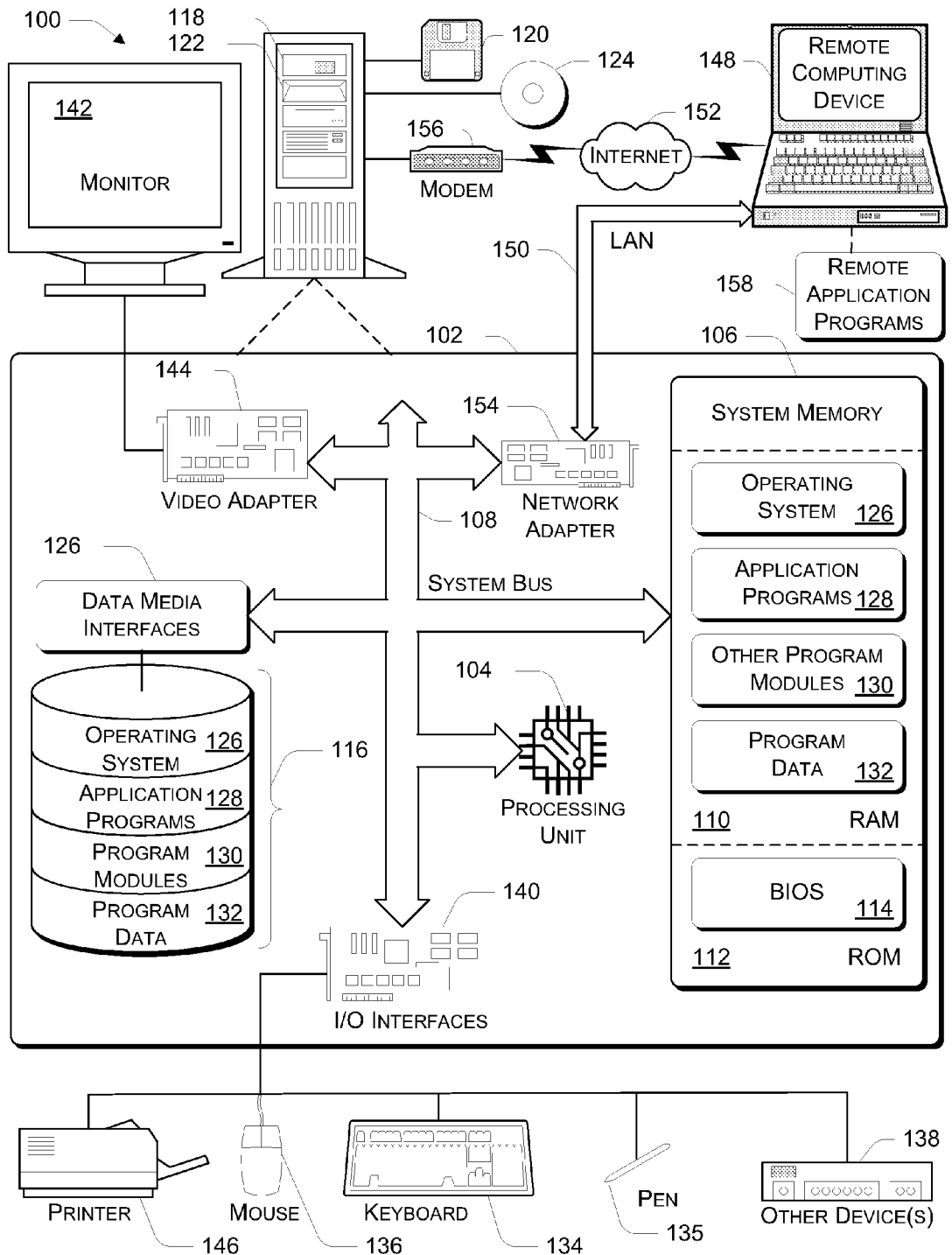
FIG. 1 is an exemplary computing environment.

FIG. 1 illustrates an example of a computing environment 100 within which the computer, network, and system architectures described herein can be either fully or partially implemented. Exemplary computing environment 100 is only one example of a computing system and is not intended to suggest any limitation as to the scope of use or functionality of the network architectures. Neither should the computing environment 100 be interpreted as having any dependency or requirement relating to any one or combination of components illustrated in the exemplary computing environment 100.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Page-view recording with click-through tracking may be described in the general context of computer-executable instructions, such as program modules, being executed by a computer. Generally, program modules include routines, programs, objects, components, data structures, etc. that perform particular tasks or implement particular abstract data types. Page-view recording with click-through tracking may also be practiced in distributed computing environments where tasks are performed by remote processing devices that are linked through a communications network. In a distributed computing environment, program modules may be located in both local and remote computer storage media including memory storage devices.

The computing environment 100 includes a general-purpose computing system in the form of a computer 102. The components of computer 102 can include, by are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 102 typically includes a variety of computer readable media. Such media can be any available media that is accessible by computer 102 and includes both volatile and non-volatile media, removable and non-removable media. The system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 typically contains data and/or program modules that are immediately accessible to and/or presently operated on by the processing unit 104.

Computer 102 can also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 126. Alternatively, the hard disk drive 116, magnetic disk drive 118, and optical disk drive 122 can be connected to the system bus 108 by a SCSI interface (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 130, and program data 132. Each of such operating system 126, one or more application programs 128, other program modules 130, and program data 132 (or some combination thereof) may include an embodiment of a page-view recording with click-through tracking.

Computer system 102 can include a variety of computer readable media identified as communication media. Communication media typically embodies computer readable instructions, data structures, program modules, or other data in an information delivery media. By way of example, and not limitation, communication media includes wired media such as a wired network or direct-wired connection. Combinations of wireless media such as acoustic, RF, infrared, and other wireless media with any of the above wired media are also included within the scope of computer readable media.

A user can enter commands and information into computer system 102 via input devices such as a keyboard 134, a pen 135, and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device can also be connected to the system bus 108 via an interface, such as a video adapter 144. In addition to the monitor 142, other output peripheral devices can include components such as speakers (not shown) and a printer 146 which can be connected to computer 102 via the input/output interfaces 140.

Computer 102 can operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that can include many or all of the elements and features described herein relative to computer system 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet. When implemented in a LAN networking environment, the computer 102 is connected to a local network 150 via a network interface or adapter 154. When implemented in a WAN networking environment, the computer 102 typically includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or portions thereof, may be stored in a remote memory storage device. By way of example, remote application programs 158 reside on a memory device of remote computer 148. For purposes of illustration, application programs and other executable program components, such as the operating system, are illustrated herein as discrete blocks, although it is recognized that such programs and components reside at various times in different storage components of the computer system 102, and are executed by the data processor(s) of the computer.

Exemplary Architecture

Figure 2:
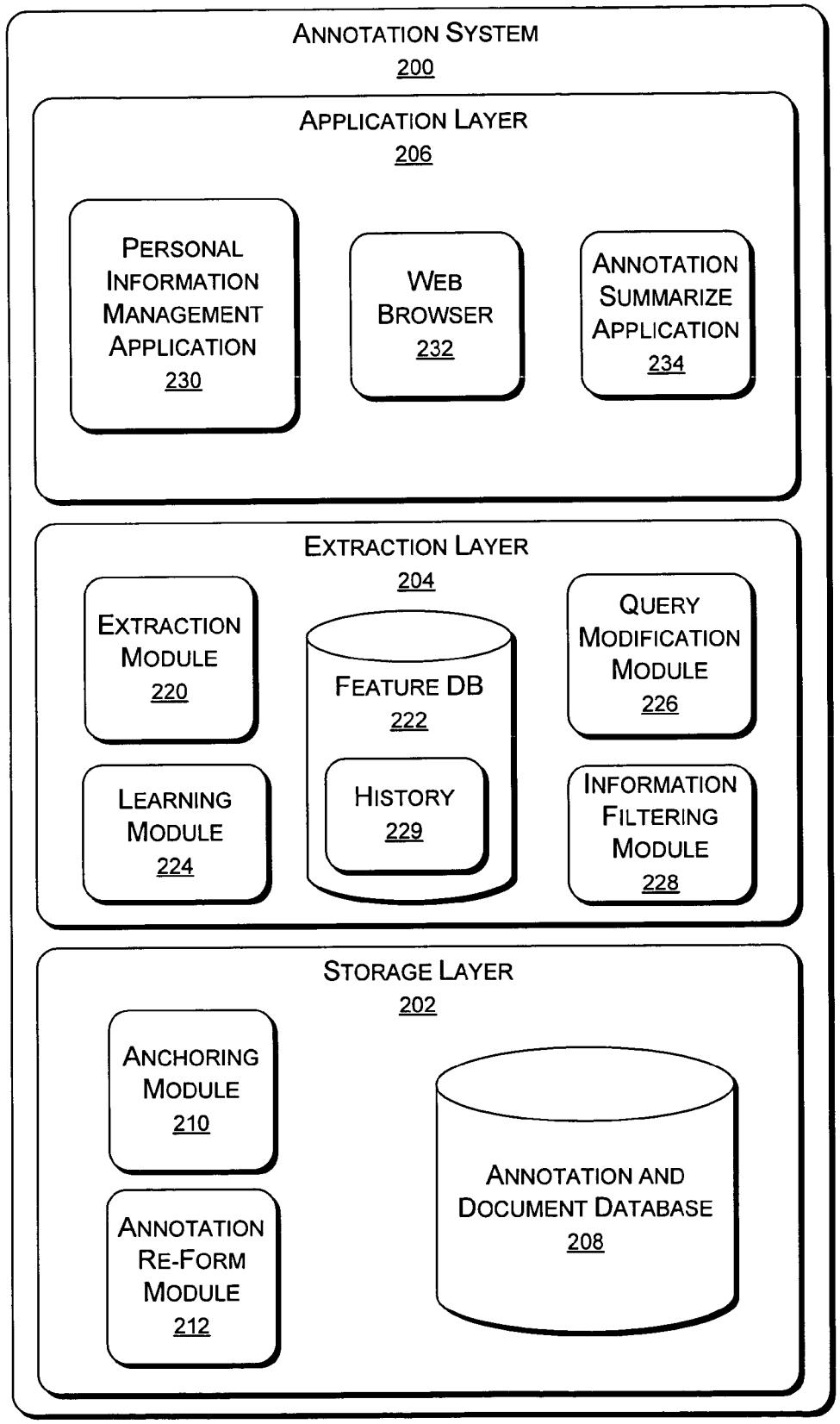
FIG. 2 is a simplified block diagram of an annotation system architecture.

FIG. 2 is a block diagram of an exemplary annotation system 200 in accordance with the described systems and methods. The annotation system 200 includes a storage layer 202, an extraction layer 204 and an application layer 206. The various components shown in each particular layer may change with each particular implementation.

Generally, the storage layer 202 takes raw strokes, markup, free notes and documents as input and stores the classified and recognized annotation and its anchored text into an annotation and document database 208. The storage layer 202 includes an anchoring module 210 and an annotation re-form module 212. The anchoring module 210 collects information about the location of each annotation with respect to objects on a document page. This allows the annotations to be anchored so that they appear in the same location each time the document is recalled. The annotation re-form module 212 is configured to retrieve anchoring data when a page is recalled and to re-form each annotation in its proper place in when the page is rendered.

The extraction layer 204 includes components which extract related semantic features from annotations and actions. Two kinds of features are extracted: the annotations per se, and context information related to the annotations. Context information may include, but is not limited to, time, location, surrounding text, etc.

The extraction layer 204 includes an extraction module 220, a feature database 222, a learning module 224, a query modification module 226 and an information filtering module 228. The extraction module 220 is configured to extract all kinds of information, including document features, annotated text, annotation features, context, etc. The extracted features are stored in the feature database 222.

The learning 224 module is configured to track user behavior and use information obtained therefrom to refine the annotation system. The query modification module 226 is configured to assist in constructing search queries that are used to locate content and local keywords in which a user may be interested. The information filtering module 228 is configured to filter and refine raw information obtained in a search for more appropriate presentation to a user. The feature database 222 also includes a history 229 that stores search terms for each particular user of a system and for all users of a system. The history 229 is referred to (as described in greater detail below) when weighting search terms for context searches and keyword searches.

The application layer 206 contains applications that utilize and support annotations. In the example shown, the application layer 206 includes a personal information management application 230 and a web browser 232. An annotation summarize application 234 is also stored in the application layer 206 and is used to collect and summarize information about annotations entered into the system. In systems that provide for multiple users, the annotation summarize application 234 differentiates between annotations for each user and can summarize them separately or as a whole.

Anchoring Annotations

Although not necessarily required, in some implementations it may be desirable to anchor annotations to objects so that the annotations may be re-formed in the same relative location on a page when the page is re-formed, such as when the page is refreshed or when a user returns to a previously-annotated page. The following example shows but one technique for anchoring annotations. Although the following example is described with regard to Internet Explorer®, the described technique may be used in other contexts.

To anchor an annotation, the annotation module 210 obtains a rectangle bounding box for each object in a web page from a document object model (DOM) tree associated with the web page. From this information, a two-dimensional position is derived for each object. The annotation is also modeled as a polygon in a two-dimensional space. The annotation anchoring problem is then essentially a polygon intersection problem. The object and annotation information (e.g. positions) are stored in the annotation and document database 208.

When a page is re-drawn, the annotation re-form module 212 retrieves position information from the annotation and document database 208. The similarity between each page object and the anchored objects are calculated to determine if they are the same. If so, then any annotations that reside on the page are re-formed in the same position relative to the page objects as they originally appeared.

A special problem arises in the case where the web page contains a text paragraph, since the text paragraph will only be one object. In such a case, the text object is divided into smaller objects, e.g. each word in a paragraph is made an object (i.e. a "word object"). A pseudo-tag is inserted for each word object and the two-dimensional position for each word-object is obtained. The process then continues as described above.

Launching Tasks With Annotations

Launching tasks is an important feature for pen-based computing systems. In other types of computers, a task may be launched with a few clicks of a mouse on toolbars or icons. In pen-based systems, a pen takes the place of a mouse and is used differently. Also, in many pen-based systems, display space is at a premium and, as a result, toolbars and icons may not be present to provide a simple way to launch a task. Even when icons may be used in a system to launch a task, the icons may not be available when another application is operating.

In the systems and methods described herein, a task may be launched automatically from a particular type of annotation. For example, an application may be configured to recognize a date annotation and to automatically launch a calendar task when a date annotation is detected. The feature provides a way for a user to disable the automatic launch if desired.

Exemplary Methodological Implementation—Scheduling a Task

In a typical system, when a user wants to schedule a task in a personal information management application (e.g. FIG. 2, 230) the user must launch the application and set up the date and time information (e.g. start date, end date, due date, etc.). In addition, the user must also enter a task title to describe a name for the task, and a body description to briefly describe the task. Entering such information is fairly simple when use of a keyboard is available. However, it is very time consuming in a pen-based system. The methodological implementation described below helps simplify such a task.

Figure 3:
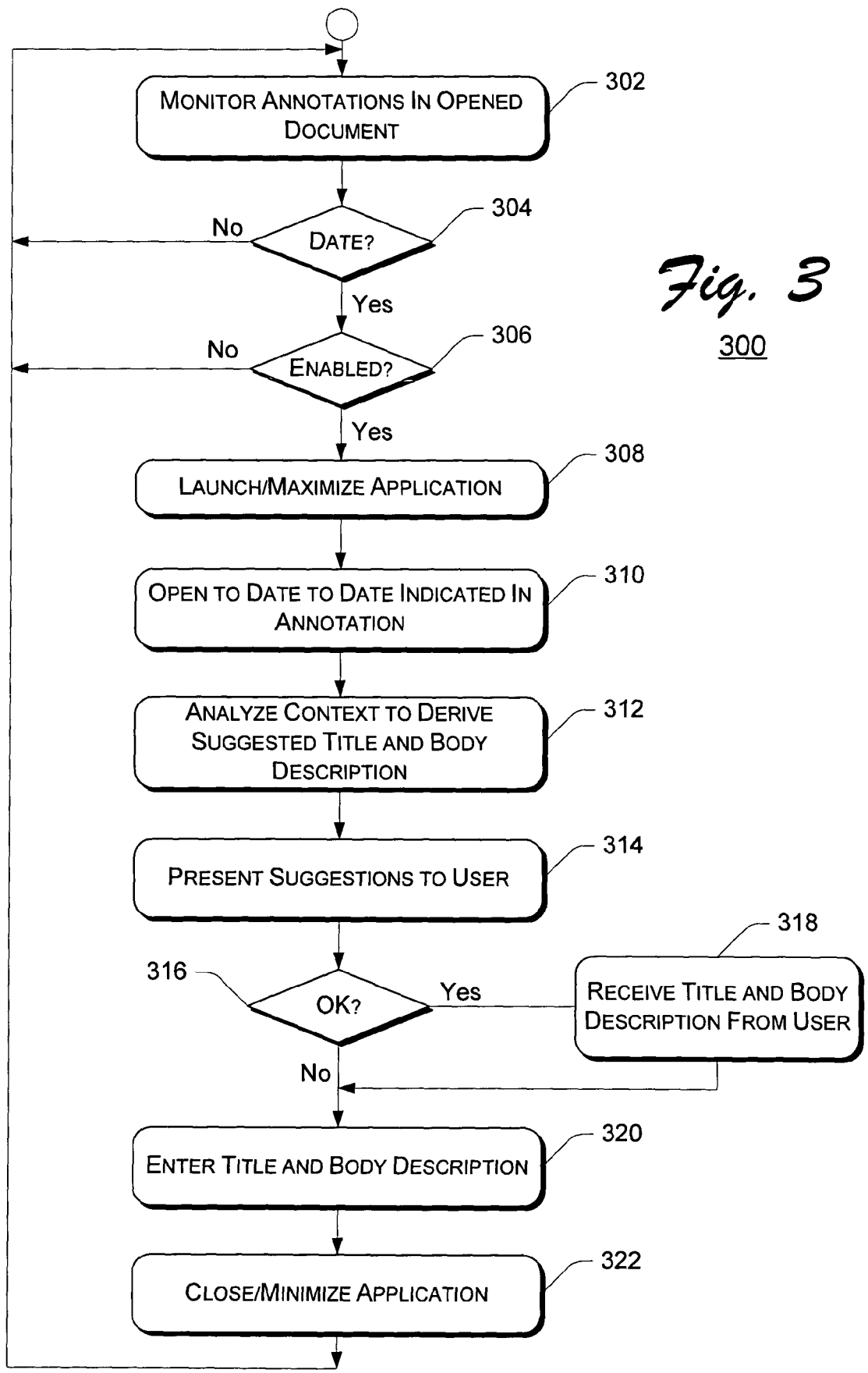
FIG. 3 is a flow diagram depicting a methodological implementation of scheduling a task with an annotation.

FIG. 3 is a flow diagram 300 depicting a methodological implementation of scheduling a task from an annotation. At block 302, the extraction module 220 monitors an opened document to detect annotation entries. The opened document may be an Internet page, a word processing document, an e-mail message, etc. As previously discussed, the extraction module monitors for markup or handwritten characters entered by a user. In this particular example, the extraction module 220 monitors for an annotation that includes a date, i.e. characters in a date format. The annotation may circle a date, underline a date, handwrite a date, etc.

For example, consider an Internet page that includes a line of text that is underlined by a user, the line reading: "the Tablet PC which will launch on November 7." The extraction module 220 is configured to identify "November 7" as a date, which will initiate the presently described function.

If an annotation is not recognized as being a date ("No" branch, block 304), then the extraction module 220 simply continues to monitor the annotations at block 302. If, however, an annotation is recognized as being a date "Yes" branch, block 304), then the extraction module determines if a date launch feature is enabled. If the feature is not enabled ("No" branch, block 306), then the extraction module 220 continues to monitor annotations at block 302. If the feature is enabled ("Yes" branch, block 306), then an associated application (personal information management application, FIG. 2, 230 in this example) is launched at block 308. If the application is already running and minimized, then it is merely maximized at block 308.

The application is opened to a page associated with the date identified in the annotation at block 310. The extraction module examines the context of the content at the location of the annotated date (block 312) to derive a suggested title and body description for the entry at that particular date. Here, the suggested title derived from the context may be "Tablet PC" and the body description might read "Tablet PC launch."

At block 314, the suggested title and body description are presented to the user in a pop-up type notification. If the user wants to accept the suggestions, the user can do so simply by tapping on (or otherwise accepting) the suggested response ("Yes" branch, block 316") and the tile and body description are entered at block 320. If the suggestions are unacceptable ("No" branch, block 316), then the user is presented with a box in which the user can enter a title and body description (block 318). After the user entries are received, they are entered at block 320.

At block 322, the application is closed or minimized, depending on the particular implementation, and the process reverts to block 302 where the annotation monitoring continues.

Using the techniques described above, a user of a pen-based computing system can more efficiently enter tasks in a time management application.

Methodological Implementation—Annotation-Based Content Search

As a user is reading an electronic document, the user may have some interest in further examining issues addressed in the document. In a typical computer system, the user can simply type a query in the search box of the local machine or an Internet search engine to find related information. However, this is not such a simple task in a pen-based computer system. In addition, the mere entry of search terms in a search box does not reveal a context of the user's query and, as such, several results may be obtained that—while relevant to the search terms themselves—may not be relevant to the actual query the user has formed in his own mind.

Figure 4:
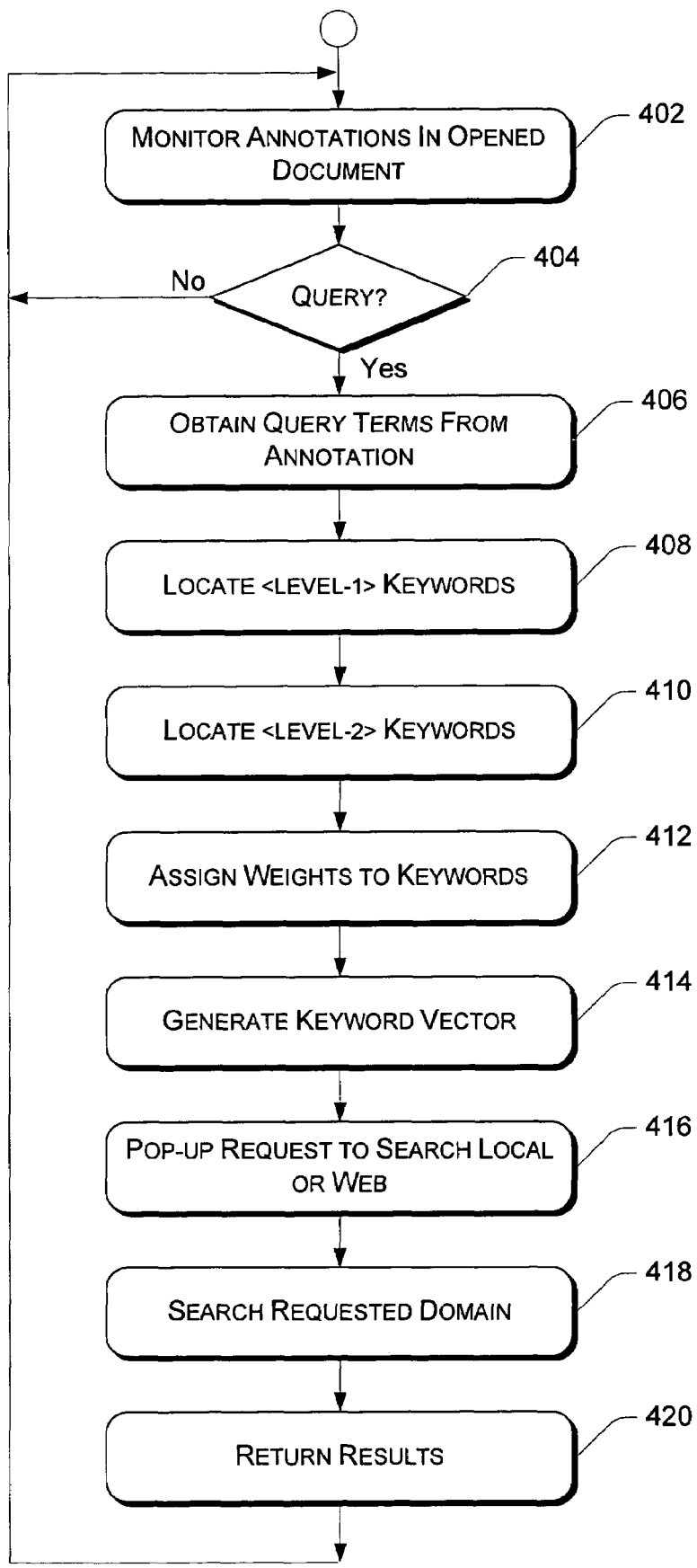
FIG. 4 is a flow diagram depicting a methodological implementation of a content search using keywords derived from an annotation and the context of the annotation.

FIG. 4 is a flow diagram 400 that depicts a methodological implementation of a content search based on user annotations and keywords collected from the context of the annotations (performed by the query modification module 226, FIG. 2). The content search process depicted in FIG. 4 is driven by a user's annotations and takes into account the context of the annotations used to drive the search. It is noted that, although not shown in the flow diagram 400, the feature depicted by the flow diagram 400 may be conveniently disabled by a user. In such a case, the steps in the process described below—other than the monitoring step—will not be executed.

There are two methods in which a query context may be used to better refine the search results to the user's interest. One method is query generation, in which the context is used to form the search query. The other method is search result re-ranking, wherein a typical search is performed on one or more keywords derived from an annotation, and then the context is applied to the search results and the search result re-ranked so that the more relevant results are listed before the less relevant results.

The flow diagram 400 and the following description focus on query generation using a query context. Those skilled in the art will appreciate that the same steps performed in a different order may be used to provide the search result re-ranking technique.

At block 402, annotations are monitored in an opened document. The document may be any type of electronic document, such as a web page, a word processing document, an e-mail message, and the like. As long as no annotation that triggers a content search is entered ("No" branch, block 404), then the monitoring continues at block 402. If an annotation is entered that is determined to be an annotation to trigger a content search ("Yes" branch, block 404), then base query terms are taken from the annotation (block 406) to begin building the query that will ultimately be used in the search.

There are at least two different ways in which a content search may be recognized and initiated by a system. In a first implementation, the user annotates the terms in which the user is interested and then performs an operation that tells the system to perform a content search. This operation may be creating an annotation that the system recognizes as a command to perform a content search, selecting a search icon, or the like. In at least one implementation, the system may pop up a menu that includes a content search option upon recognizing the annotations or upon an event of a user moving a pen or stylus over the annotation. The user may then select a content search option from the popup menu.

In a second implementation, the system automatically initiates a content search by recognizing that the user may want to perform a content search. This may be implemented by having particular annotations initiate a content search. For example, a system may be programmed to initiate a content search when a user circles certain terms, when a user double underlines text, when a user highlights text, etc.

As an example of deriving base query terms, suppose a user is reading a web page article about a motorcycle club for enthusiasts of the "Indian" brand of motorcycles and the user—who happens to be interested in buying a motorcycle—wants to see more information about "Indian" motorcycles. So as the user is reading the article, the user makes an annotation about the word "Indian." This annotation may be a circle around the word, a double underline of the word, etc.

The formulation of the search query is then started with the base term "Indian." However, if the search were performed on this singular term, the user would get results ranging from articles about American Indians to articles about the country India to book reviews on a book entitled "Indian Summers in New England." An article in which the user may be genuinely interested—such as a consumer report about "Indian" motorcycles—would likely be listed far down the list, causing the user to have to peruse a significant number of titles before locating one of interest.

But at block 408, <level-1> keywords are located in a document object model (DOM) tree associated with the document and they are added to the query. <Level-1> keywords are defined as features of the document object which is relatively close to the annotation in the DOM tree. Exactly how close to the annotation is an implementation detail that may be defined for each particular application. In this example, the additional search term "motorcycle" may be added to the base query term of "Indian." This narrows the search results considerably.

In addition, at block 410, <level-2> keywords are located in the DOM tree. <Level-2> keywords are features that are in a range further away from the annotation in the DOM tree than <level-1> features are. In the present example, this may add additional search terms such as "meetings," "information" and "news" (such as in a sentence that "members hold monthly meetings where they share information, news and anecdotes related to Indian motorcycles."

The search terms are then assigned a particular "weight" at block 412. The annotated, or base, term is given a highest weight and <level-2> terms are given the lowest weight, with <level-1> terms being given a weight somewhere in between the two. The query search terms and their respective weights are used to generate a keyword vector at block 414.

A keyword vector includes keywords that each have a weight associated with them. In the present example, a keyword vector may be derived as: [(Indian, 0.6)(motorcycle, 0.4)(information, 0.1)(meetings 0.1)]. The subsequent search will then rank results according to the weights.

The keyword vectors may be used in any way known in the art to perform weighted searches. In at least one implementation, a keyword vector is used with a cosine measurement to calculate the similarity with the documents:

$$\text{Sim}(q, D) = \frac{\sum\limits_{t_j \in \bigcap (q_j, D_j)} q_j D_j}{\sqrt{\sum q_k^2} \sqrt{\sum D_k^2}}$$

At block 416, the user is provided with a pop-up menu to specify a domain where a search should be performed. For instance, the pop-up menu may specify a local computer, a local network drive, the Internet, etc. In addition, the pop-up menu may also specify a "Do Not Search" option wherein the user may cancel the search. The specified domain is then searched at block 418 and the results are returned to the user at block 420.

It will be appreciated that a query containing the weighted terms "Indian," "motorcycle," "meetings," "information" and "news" is much more likely to return results close to the top that deal with what the user is really looking for than a simple query of "Indian." As such, the user saves time and effort by having such a feature available to him.

As previously noted, an alternative to the query generation described above is re-ranking the results. In such a process, a search is initially performed using only the annotation term, "Indian." The keyword vector is generated as described above and, after the numerous results are received, the results are re-ranked according to the keyword vector. Such a technique provides results similar to the results obtained using the query generation method.

Methodological Implementation—Annotation-Based Keyword Search

In other instances, a user may want to find key terms in a document that the user is currently reading. The typical method of entering key terms in a search box to find in the present document are difficult to execute in a pen-based system. In addition, the method must be repeated for each key term the user wishes to find in the document.

For a pen-based system, it is more efficient for the user to annotate one or more key terms that the user wishes to locate in a document the user is reading and have the key terms automatically located. The annotation-based keyword search described below depicts such a process.

Figure 5:
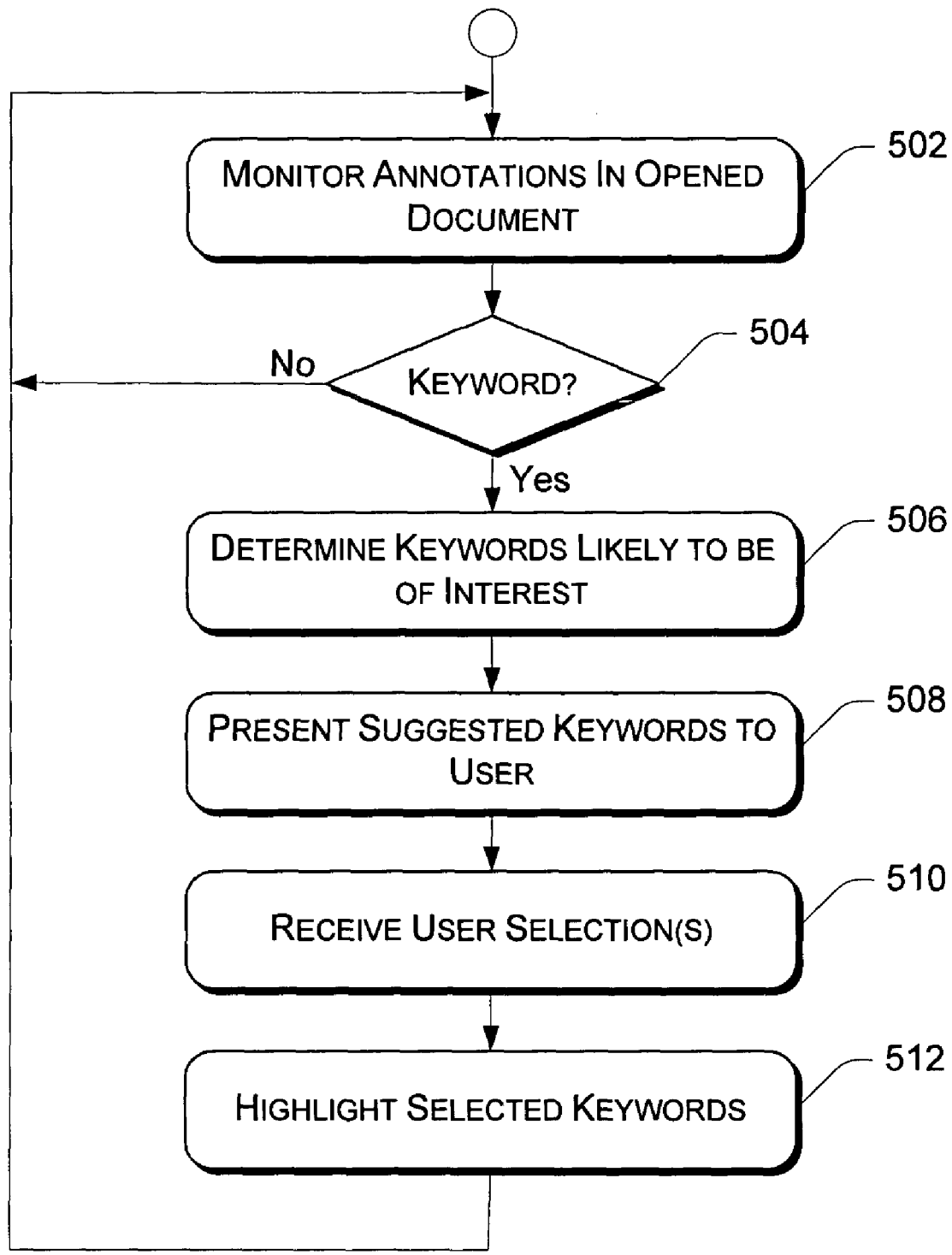
FIG. 5 is a flow diagram depicting a methodological implementation of a keyword search using annotations.

FIG. 5 is a flow diagram 500 that depicts a methodological implementation of an annotation-based keyword search. At block 502, annotations are monitored in an opened document. As previously discussed, the document may be any type of electronic document, such as a web page, a word processing document, an e-mail message, and the like. As long as no annotation that triggers a keyword search is entered ("No" branch, block 504), then the monitoring continues at block 502. If an annotation is entered that is determined to be an annotation to trigger a keyword search ("Yes" branch, block 504), then keywords likely to be of interest to the user are determined at block 506.

Determining one or more annotations that will trigger a keyword search may be implemented in one or more of several ways. For example, a system may be programmed to initiate a keyword search if a user moves a pen over the annotation to popup a menu and then selects a keyword search item from the menu. In at least one other implementation, a certain type of annotation may be used to trigger a keyword search.

There are four methods for making the determination of what keywords are likely to be of interest to the user that may be used in this step. In this particular implementation, the information filtering module 228 (FIG. 2) is configured to perform the tasks described below.

A first method determines Pr(w|u): given the current user (u), what words (w) may be of interest to him? To make such a determination, the learning module (224, FIG. 2) is configured to monitor a user's behavior and store certain data related to that behavior in the feature database (222, FIG. 2).

To implement a long-term interest model, the learning module 224 tracks words appearing in all documents read by the user and the information filtering module 228 determines the importance of the words appearing in the current document by determining the frequency at which the words in the current document were tracked by the learning module 224.

Tracking each particular word may provide an overly burdensome task on a system. Therefore, certain parts of grammar that typically appear in documents may be routinely omitted in such an implementation. For example, words such as "the", "or", "because", etc. may not be tracked.

It may be desirable for such a process to provide more of a focus on a short-term interest of the user. In such a case, only words appearing in documents recently accessed by the user may be compared against the words in the current document. For example, the words in the current document may only be compared against documents accessed by the user in the previous week.

A second method for determining keywords likely to be of interest to the user may focus on an annotation made by the user. In such an implementation, the information filtering module 228 determines words that frequently appeared in documents that contained the annotated word(s). Those words are then determined to be keywords that may be of interest to the user.

A third method for determining keywords likely to be of interest to the user determines key related words based on the user's past annotations. In such an implementation, a history of a user's past annotations is maintained. Keywords are compared against the history and a weight associated with the keywords is adjusted according to whether the keyword is present in the history and, if so, when the keyword was last entered as an annotation by the user.

A higher weight will be associated with a keyword that is found to have been entered (by referencing the history) relatively recently by the user. Similarly, a keyword found in the history but used a longer period of time ago, will receive a smaller weight adjustment. Keywords not found in the history will not have an increased weight, but will maintain a general weight or have an already assigned weight decreased.

A fourth method is similar to the third method, except that past annotations of all users—not only the current user—are considered. The same technique described above—using an annotation history—is also utilized here, except that a history containing all annotations from all users is used.

After keywords that are likely to be of interest to the user are determined, these keywords are presented to the user as suggested keywords (block 508). The user then selects one or more of the suggested keywords at block 510. The selected keywords are then highlighted throughout the document at block 512, each unique keyword being highlighted in a different color (if the system display is a color display).

Methodological Implementation—Annotation-Based Gestures

Another way in which pen-based computing systems may be easier to manage by utilizing annotations is a case wherein a user may assign a particular task to a particular gesture. A gesture is an ink object that commands or controls functionality of a computer rather than an ink object that is handwriting or a drawing. Therefore, a user may make an annotation and then associate an underlying task with that annotation. Thereafter, when the system detects the same annotation, the system will execute the task associated with the annotation.

Figure 6:
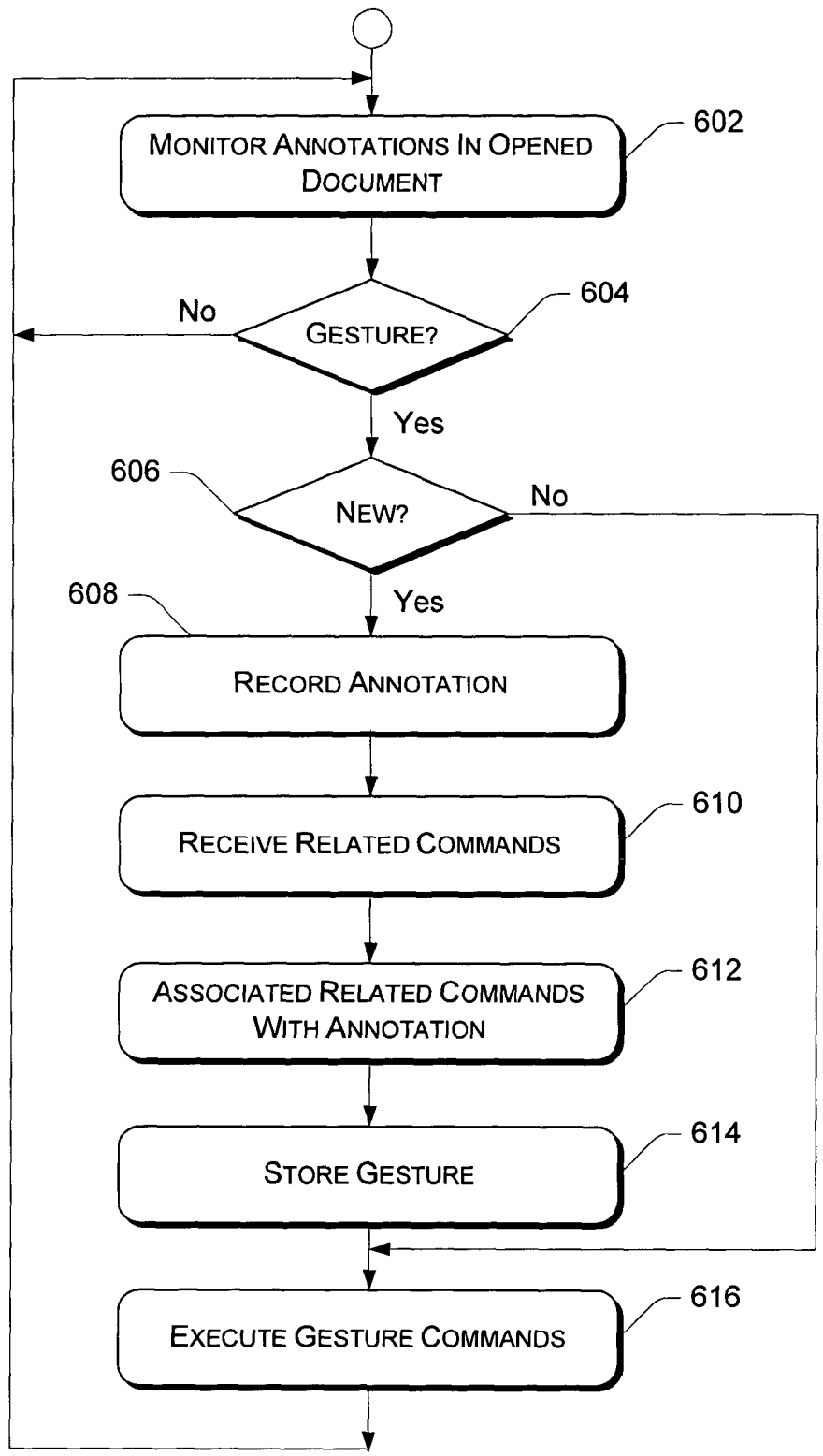
FIG. 6 is a flow diagram depicting a methodological implementation of using annotations as gestures.

FIG. 6 is a flow diagram 600 that depicts a methodological implementation of using annotations as gestures in a pen-based system. At block 602, the extraction module 220 (FIG. 2) monitors annotations in an opened electronic document. As long as no annotation is detected that signifies a gesture ("No" branch, block 604), then the monitoring continues at block 602. If a gesture is detected ("Yes" branch, block 604), then it is determined if the gesture is a new gesture or a previously used gesture.

There are many ways in which a user may signify to a system that a particular annotation is a gesture. In one implementation, the user makes an annotation and presses on the annotation for more than one second. The extended tap by the pen indicates to the system that the annotation being pointed to is meant to be a gesture.

When a gesture is indicated, the system must search the feature database 222 to determine if the gesture has been used before. If the gesture is a new gesture ("Yes" branch, block 606), then the annotation is recorded, i.e. stored in the feature database 222 (block 608). After the gesture indication is made by the user, the user then enters one or more commands that are to be associated with the gesture annotation. These commands that are related to the gesture are received at block 612 and stored in the feature database 222 with the related annotation at block 614. The gesture commands are then executed at block 616.

If the gesture is located in the feature database 222 after the gesture indication is detected, i.e. the gesture is not a new gesture, but has been used before ("No" branch, block 606), then the commands associated with the gesture are retrieved from the feature database 222 and are executed at block 616.

As an example, consider a user who wants to create a gesture to open a Calendar application. The user decides that an infinity mark (∞) will be used to launch the Calendar application. The user marks the annotation (infinity mark) on the electronic document that is open, then taps and holds the pen on the infinity mark. The first time the user does this, the system will not find a gesture and will prompt the user to enter commands to associate with the annotation. The user then takes steps to launch the Calendar application. These steps are then associated with the infinity mark and the annotation and associated steps are stored.

The next time the user wishes to launch the Calendar application, the user makes the infinity mark and presses and holds the mark. The system will recognize the gesture and will execute the commands to launch the Calendar application, thus saving the user time and steps in launching the application.

As with the other features, the system includes a convenient way that the user may turn this feature off if so desired.

CONCLUSION

The systems and methods as described thus provide a way to better manage annotations in a pen-based system so that the system is easier for a user to use to perform typical tasks. Providing a pen-based system that is more convenient for a user to utilize promotes the use of pen-based systems in the marketplace.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method of managing annotations in a pen-based computing system, the method comprising:
   monitoring an electronic document for user annotations;
   recognizing entry of an annotation into the electronic document;
   collecting context data proximal to the annotation, wherein the context data comprises:
      time;
      location; and
      surrounding text; and
   determining whether the annotation comprises a gesture, wherein the gesture is an ink object commanding user defined functionality of a computer;
   determining whether the annotation is associated with a date;
   responsive to determining the annotation is associated with a date, determining if a date launch feature is enabled, such that:
      in an event no date launch feature is enabled, continuing monitoring the electronic document for user annotations;
      in an event the date launch feature is enabled, launching an associated application;
   locating information related to the annotation using the annotation and the context data;
   wherein the collecting context data comprises:
      deriving at least two search terms;
      comparing the search terms to a history of search terms; and
      weighting each of the search terms according to whether a particular search term is included in the history of search terms, a higher weight being assigned to a search term that is included in the history of search terms; and
   wherein the locating information related to the annotation comprises:

determining keywords that are likely to be of interest to a user based on the annotation and words contained in documents previously accessed by the user; and using the keywords to locate information such that:
in an event a user-specified domain is selected, the keywords are used to locate information in one of a plurality of user-specified domains comprising:
a local computer;
a local network drive; and
the Internet.

2. The method as recited in claim 1, wherein the collecting context data further comprises extracting one or more words from text proximal to the annotation.

3. The method as recited in claim 1, wherein the collecting context data further comprises locating objects near to an annotation object in a document object model (DOM) associated with the annotation.

4. The method as recited in claim 1, wherein the collecting context data further comprises:
defining a first distance from the annotation;
defining a second distance from the annotation;
locating one or more keywords that are within the first distance from the annotation;
locating one or more keywords that are within the second distance from the annotation but not within the first distance from the annotation;
weighting the one or more keywords according to their distance from the annotation, with keywords within the first distance having a greater weight than keywords within the second distance but not within the first distance; and
wherein the locating information related to the annotation utilizes the keywords according to the weights assigned thereto.

5. The method as recited in claim 1, wherein the history of search terms comprises a history of search terms used by a particular user.

6. The method as recited in claim 1, wherein the history of search terms comprises a history of search terms used by all users of a particular group of users.

7. The method as recited in claim 1, wherein the locating information related to the annotation further comprises searching the electronic document for terms that match or are similar to the annotation.

8. The method as recited in claim 1, wherein the locating information related to the annotation further comprises searching remote sites for documents containing terms that match or are similar to the annotation.

9. The method as recited in claim 1, wherein the documents that were previously accessed by the user are limited to documents accessed within a specified time period.

10. The method as recited in claim 1, wherein the determining keywords that are likely to be of interest to a user based on the annotation and words contained in documents previously accessed by the user comprises:
determining keywords that are likely to be of interest to the user based on the annotation and words occurring with the annotations in the documents that were previously accessed by the user.

11. The method as recited in claim 1, wherein annotations are recognized from a plurality of types of annotations, the plurality of types of annotations comprising:
circle;
underline
block;
arrow;
callout;
free note; and
post-it note.

12. The method as recited in claim 1, further comprising:
detecting user input comprising a gesture associated with a search task;
wherein the locating information related to the annotation using the annotation and the context data is performed responsive to the detecting.

13. The method as recited in claim 12, further comprising:
assigning, by the user, the search task to the gesture so as to associate the gesture with the search task.

14. An annotation management system, comprising:
a processor;
a system memory coupled to the processor, the system memory comprising:
a feature database configured to store a gesture comprising an ink object commanding user defined functionality of the system;
an annotation monitoring module configured to monitor an electronic document for entry of an annotation;
the annotation monitoring module further configured to recognize entry of an annotation into the electronic document;
an extraction module configured to perform acts comprising:
collecting context data that appears proximal to the annotation, wherein the context data comprises:
time;
location; and
surrounding text; and
determining whether the annotation comprises a gesture, wherein the gesture is an ink object commanding user defined functionality of a computer;
determining whether the annotation is associated with a date;
responsive to determining the annotation is associated with a date, determining if a date launch feature is enabled, such that:
in an event no date launch feature is enabled, continuing monitoring the electronic document for user annotations;
in an event the date launch feature is enabled, launching an associated application;
a query modification module configured to locate information related to the annotation using the annotation and the context data;
the extraction module further configured such that collecting context data comprises:
deriving at least two search terms;
comparing the search terms to a history of search terms; and
weighting each of the search terms according to whether a particular search term is included in the history of search terms, a higher weight being assigned to a search term that is included in the history of search terms; and
an information processing module configured to locate information related to the annotation, wherein the locating information related to the annotation comprises:
determining keywords that are likely to be of interest to a user based on the annotation and words contained in documents previously accessed by the user; and
using the keywords to locate information such that:

in an event a user-specified domain is selected, the keywords are used to locate information in one of a plurality of user-specified domains comprising:
- a local computer;
- a local network drive; and
- the Internet.

15. The system as recited in claim 14, wherein:
the context data comprises a plurality of keywords derived from text proximal to the annotation;
the extraction module is further configured to weight each keyword according to a relative distance that the keyword is from the annotation; and
the information processing module is further configured to locate the related content based on the weighted keywords as weighted according to the relative distance that each keyword is from the annotation.

16. The system as recited in claim 15, wherein a search is performed using the annotation as a search term and the results of the search are re-ranked according to the weighted keywords as weighted according to the relative distance that each keyword is from the annotation.

17. The system as recited in claim 15, wherein a search is performed using a query derived from the annotation and the weighted keywords as weighted according to the relative distance that each keyword is from the annotation.

18. The system as recited in claim 14, wherein the related content located by the information processing module comprises keywords contained in the electronic document.

19. The system as recited in claim 14, wherein the related content located by the information processing module comprises documents on a network that contain one or more of the keywords.

20. The system as recited in claim 14, wherein the information processing module is further configured to determine suggested keywords that are likely to be of interest to the user based on the annotation and words appearing in other documents previously accessed by the user in which the same annotation was entered.

21. The system as recited in claim 20, further comprising a user interface configured to present the suggested keywords to the user and provide for selection of none or one or more of the suggested keywords by the user.

22. The system as recited in claim 14, wherein the information processing module is further configured to perform a search to locate the related content responsive to when the annotation monitoring module detects user input of a gesture that is associated with a search task.

23. One or more computer-readable media comprising non-volatile storage, the computer-readable media having computer-executable instructions embodied thereon, the computer-executable instructions when the computer-readable media is operably coupled to a processor being executed on a computer to program the computer to perform steps comprising:
monitoring an electronic document for user annotations;
recognizing an annotation entered into the electronic document;
collecting context data proximal to the annotation, wherein the context data comprises:
- time;
- location; and
- surrounding text; and determining whether the annotation comprises a gesture, wherein the gesture is an ink object commanding user defined functionality of a computer;
determining whether the annotation is associated with a date;
responsive to determining the annotation is associated with a date, determining if a date launch feature is enabled, such that:
in an event no date launch feature is enabled, monitoring the electronic document for user annotations;
in an event the date launch feature is enabled, launching an associated application;
locating information related to the annotation using the annotation and the context data;
wherein the collecting context data comprises:
deriving at least two search terms;
comparing the search terms to a history of search terms; and
weighting each of the search terms according to whether a particular search term is included in the history of search terms, a higher weight being assigned to a search term that is included in the history of search terms; and
wherein the locating information related to the annotation comprises:
determining keywords that are likely to be of interest to a user based on the annotation and words contained in documents previously accessed by the user; and
using the keywords to locate information such that:
in an event a user-specified domain is selected, the keywords are used to locate information in one of a plurality of user-specified domains comprising:
- a local computer;
- a local network drive; and
- the Internet.

24. The one or more computer-readable media as recited in claim 23, wherein annotations are recognized from a plurality of types of annotations, the plurality of types of annotations comprising:
- a circle;
- a box;
- an arrow;
- an underline;
- a double underline;
- a bracket;
- a highlight;
- a handwritten character;
- a free note;
- a post-it note.

25. The one or more computer-readable media as recited in claim 23, wherein the collecting context data related to the location of the annotation comprises collecting objects occurring within a certain distance from an annotation object in a document object model associated with the annotation object.

26. The one or more computer-readable media as recited in claim 23, wherein the locating additional content comprises locating one or more local keywords in the electronic document.

27. The one or more computer-readable media as recited in claim 23, wherein the locating additional content comprises locating one or more documents on a network that include one or more words indicated by the annotation or one or more keywords derived from the context data or from the documents that were previously accessed by the user.

28. The one or more computer-readable media as recited in claim 23, wherein the locating additional content comprises deriving the one or more keywords from the context data by identifying words that frequently appear with the annotation in other documents accessed by the user.

29. The one or more computer-readable media as recited in claim 23, wherein the steps further comprise:

ranking search results according to the weighted search terms.

30. The one or more computer-readable media as recited in claim 29, wherein the previously-used keywords were previously used by a current user, and wherein the weighting of at least a portion of the search terms comprises assigning a higher weight to search terms that are included in the keyword history list for the current user.

31. The one or more computer-readable media as recited in claim 29, wherein the previously-used keywords were previously used by all users in a group of users, and wherein the weighting of at least a portion of the search terms comprises assigning a higher weight to search terms that are included in the keyword history list for the group of users.

32. The one or more computer-readable media as recited in claim 23, wherein the steps further comprise:

detecting user input of a gesture that is associated with a search task;

wherein the locating additional content that may be of interest to the user by executing a search is performed responsive to the detecting.

* * * * *